Oct. 8, 1957        H. C. WINKEL        2,808,800
GROUP BURNING FIXTURE Filed March 7, 1952                                              6 Sheets-Sheet 1

*fig. 1*

INVENTOR.
HERBERT C. WINKEL
BY
ATTORNEY

Oct. 8, 1957  H. C. WINKEL  2,808,800
GROUP BURNING FIXTURE
Filed March 7, 1952  6 Sheets-Sheet 2 fig. 6 fig. 2

INVENTOR.
HERBERT C. WINKEL
BY
ATTORNEY

Oct. 8, 1957  H. C. WINKEL  2,808,800
GROUP BURNING FIXTURE
Filed March 7, 1952  6 Sheets-Sheet 4 fig. 4 fig. 7

INVENTOR.
HERBERT C. WINKEL
BY
ATTORNEY

Oct. 8, 1957 H. C. WINKEL 2,808,800
GROUP BURNING FIXTURE
Filed March 7, 1952 6 Sheets-Sheet 5 fig. 5

INVENTOR.
HERBERT C. WINKEL
BY
ATTORNEY

Oct. 8, 1957

H. C. WINKEL 2,808,800

GROUP BURNING FIXTURE

Filed March 7, 1952

INVENTOR.
HERBERT C. WINKEL
BY
ATTORNEY

United States Patent Office 2,808,800
Patented Oct. 8, 1957

2,808,800

GROUP BURNING FIXTURE

Herbert C. Winkel, Watervliet, Mich.

Application March 7, 1952, Serial No. 275,357

18 Claims. (Cl. 113—59)

This invention relates to a fixture for holding a plurality of storage battery plates in position for fusing a terminal post thereto, commonly called a "group burning fixture," and particularly to a type thereof which is adaptable to manual operation but which is capable of rapid and accurate operation and is also capable of ready adjustment for receiving battery plate groups of varying sizes.

In the manufacture of storage batteries, one step requires the fusing of the battery terminal post onto a group of battery plates while said battery plates are maintained at predetermined spacings from each other by the interpositioning therebetween of a plurality of separators which are of non-conductive material, as wood. Inasmuch as these groups of plates must be held firmly together during the burning process, it is essential that the fixture holding same during the burning process shall hold same rigidly and firmly. Further, since said plates must be held with a high degree of accuracy and yet be handled rapidly, it is essential that the fixture be adapted for receiving said plates freely and for arranging said battery plates in their predetermined relationship to each other with as little manipulation upon the part of the operator as possible. More particularly, it is desirable to provide a fixture which will receive a plurality of groups of battery plates and will hold them sufficiently firmly as to prevent undesirable displacement thereof, but which will permit the entering of a comb-like structure between the several upstanding lugs of the individual battery plates for the twin purposes of holding said lugs in precisely predetermined, spaced, positions with respect to each other during the burning step and for forming the bottom of a basin wherein fusing material, as lead, may be retained around and in contact with the upper ends of said lugs. Further, such a device should be composed of relatively simple and sturdy parts in order that it can be made at a minimum cost and will require a minimum of maintenance.

In my application Serial No. 232,215, now Patent 2,759,445, I have disclosed a semi-automatic machine for carrying out some of these requirements on a relatively high production scale. A further problem sought to be solved in the present invention is to adapt to a manually operated device certain of the advantages and details of construction originally utilized in said semi-automatic machine.

Accordingly, a principal object of the invention is to provide a group burning fixture having a high degree of speed and accuracy and adapted for wholly manual operation.

A further object of the invention is to provide a group burning fixture, as aforesaid, capable of handling a plurality of battery plate groups in each cycle of operation.

A further object of the invention is to provide a group burning fixture, as aforesaid, which will assist the operator in positioning the battery plate groups accurately in the desirable relationship to each other prior to the burning operation.

A further object of the invention is to provide a group burning fixture, as aforesaid, in which the battery plate groups, after being initially positioned as desired, are then held firmly together for the burning step.

A further object of the invention is to provide a group burning fixture, as aforesaid, in which a comb-like structure is caused to project its teeth between the several upstanding lugs of the battery plates for the accurate spacing thereof and for the forming of a bottom of a basin for holding a quantity of fusing material.

A further object of the invention is to provide a group burning fixture, as aforesaid, which will be relatively economical to construct and will be sturdy and reliable in operation.

Other objects and purposes of the invention will become apparent to persons acquainted with equipment of this general type upon a reading of the following disclosure and inspection of the accompanying drawings.

Turning now to the drawings.

*General description*

In general my invention comprises a frame adapted for resting on a table, or other working surface. Within said frame is supported a plurality of fixed dividers and a plurality of movable dividers, said movable dividers being movable with respect to said fixed dividers for establishing a plurality of receptacles into which battery plate groups may be received, and each of said dividers being so shaped and positioned that each of said receptacles is slightly smaller at its lower end than at its upper end. One or more pairs of comb structures and dam structures are positioned at the top of the frame for movement toward and away from each other by which the teeth of the comb structures are caused to enter in between the upstanding lugs of the battery plates and cooperate with the dam structure for forming an individual container or basin around a group of such lugs for each battery plate group. A handle is provided on the operator's side of the fixture which, acting through suitable linkage, actuates said pairs of comb and dam structures to move same toward and away from each other as desired.

*Detailed description*

Figure 1:
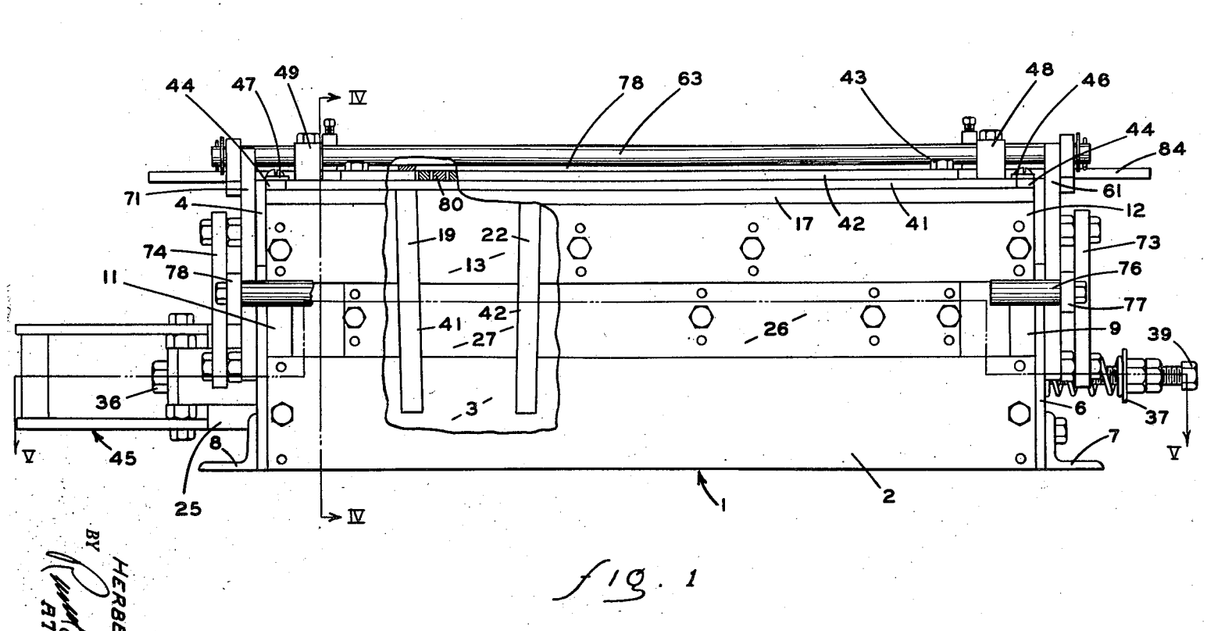
Figure 1 represents a partially broken side view of my invention as viewed from the side from which the machine is normally operated.
Figure 3:
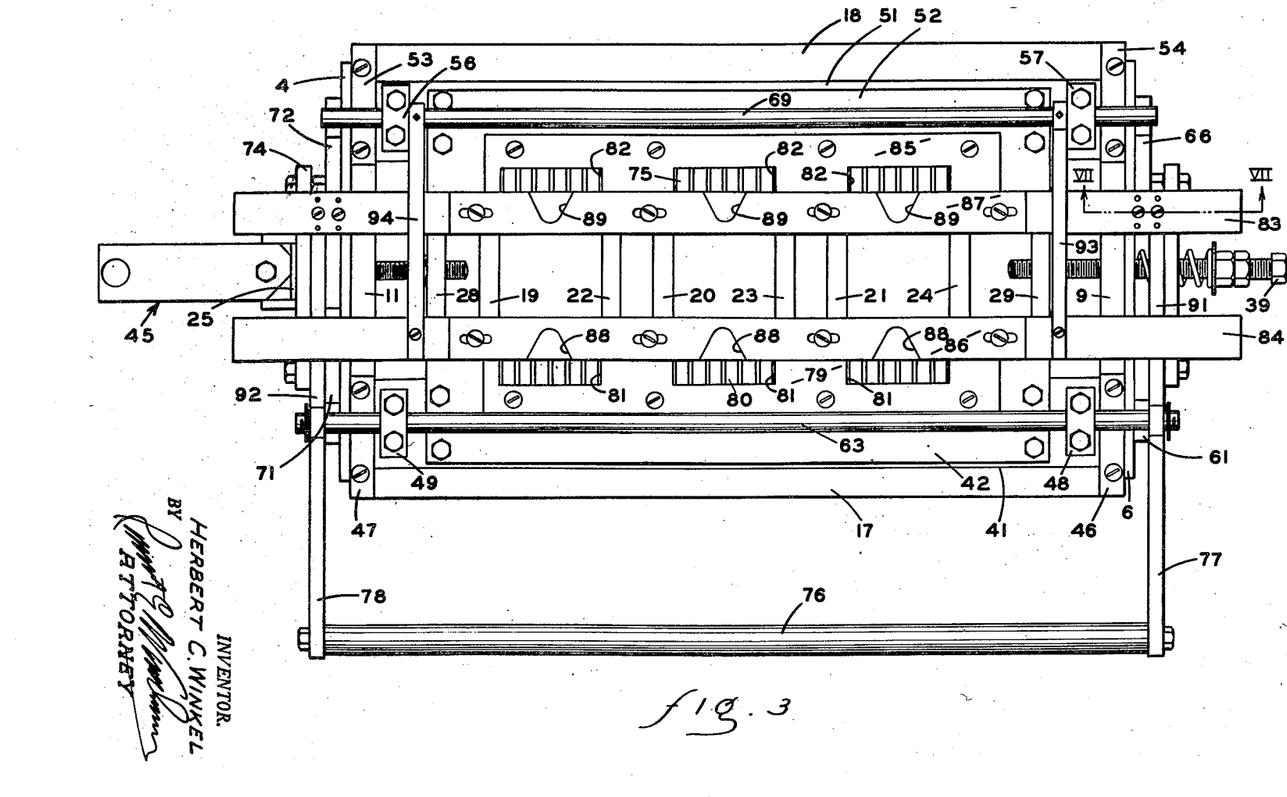
Figure 3 represents a top view of the device.

For purpose of convenience in reference, and with no intention of limiting, the following terminology will be employed. The terms "inner" and "outer" and derivatives thereof will refer to directions toward and away from the geometric center of the device. The terms "upper" and "lower" and derivatives thereof will refer to the position of the device in its normal position of use and as illustrated in Figure 1 and the terms "leftward" and "rightward" and derivatives thereof will refer to the device when positioned as appearing in any of Figures 1, 3 or 5 of the drawings.

Referring now to the drawings in detail, the device is comprised first of a base 1 which in turn comprises side plates 2 and 3 and end plates 4 and 6. Angle members 7 and 8 may be applied to the end plates if desired for bolting said device to a working surface, as a table. Inner end plates 9 and 11 are provided to stiffen the structure and join the side plates with the end plates 4 and 6.

Spaced upwardly from the side members 2 and 3 are the side members 12 and 13 which conveniently comprise the vertical flanges of the angles 14 and 15 which angles also provide sidewardly extending flanges, or table members, 17 and 18. Said angles 14 and 15 are fastened to the inner end members 9 and 11 by any convenient means, as cap screws.

Figure 4:
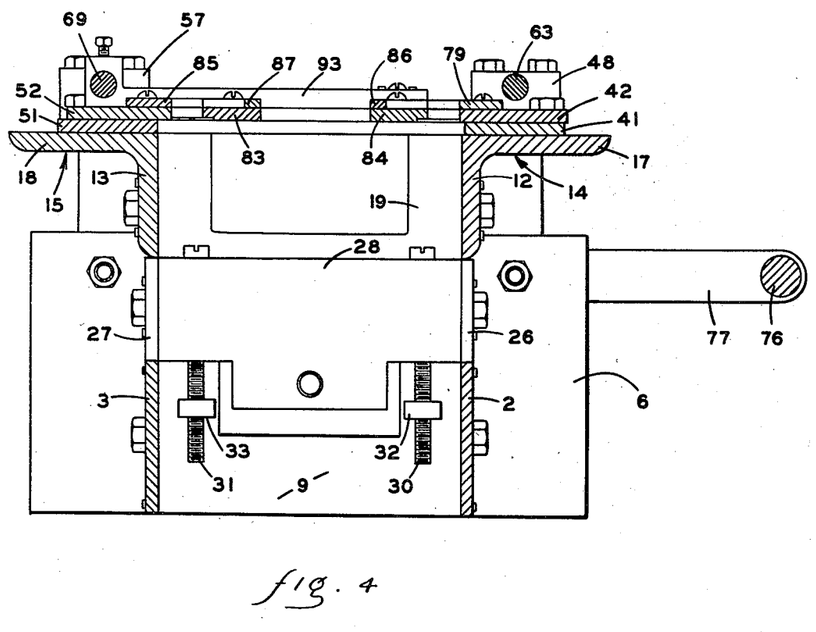
Figure 4 is a section taken on the line IV—IV of Figure 1.
Figure 5:
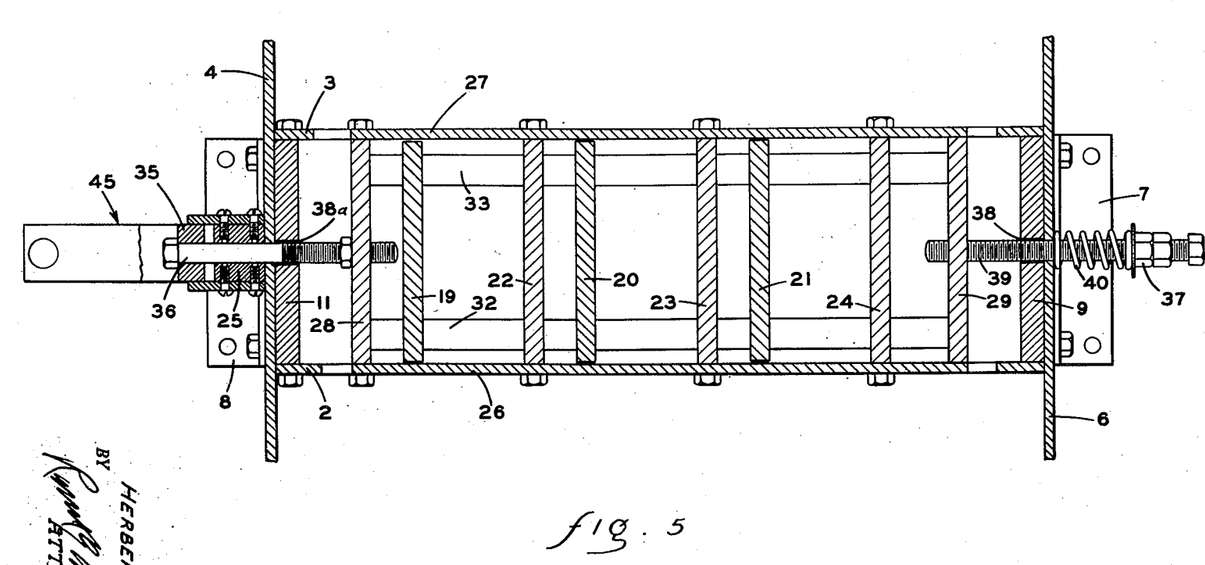
Figure 5 is a section taken on the line V—V of Figure 1.

Within said frame 1 are positioned a plurality of partitions which are adjustable with respect to each other and which function to hold the battery plate groups during the burning operation. One set of such partitions is comprised of stationary partition plates 19, 20 and 21 which are affixed in any convenient manner, as by cap screws, to the side members 12 and 13 (Figures 1, 4 and 5).

Another set of partition plates is interposed between said stationary plates (Figure 5) and are indicated at 22, 23 and 24. These partition plates are affixed at their respective sides to movable side frame members 26 and 27. Said movable side frame members rest on the respective upper edges of the side plates 2 and 3 and fit close to, but not necessarily contacting the bottom edges of the upper side frame members 12 and 13 (Figure 4). Movable frame end members 28 and 29 are fastened, as by cap screws, intermediate the movable side frame members 26 and 27 at or near the respective ends thereof. Elongated bolts 30 and 31 extend downwardly through each of the respective movable frame end members and support the bottom support strips 32 and 33 which are provided for supporting the separators of the battery plate groups. Said strips are suitably threaded for threaded cooperation with the lower ends of the bolts 30 and 31 by which said strips may be raised or lowered as desired to accommodate the fixture for handling battery plate groups of varying sizes.

Thus, the movable partition supporting frame can be slidably moved bodily toward and away from the respective end members 9 and 11 and the several movable partitions can thus be caused to move toward and away from the several respectively adjacent stationary partitions.

Bolt 39 (Figure 5) extends through a suitable opening 38 in the end plate 9 and is threadedly received into the movable frame end member 29. A spring 40 acts against the washer and nut assembly 37 to resiliently urge said bolt 39 rightwardly and this tends to pull the movable partition frame, and thereby the several movable partitions, rightwardly and away from their respectively associated stationary partitions. Rotation of the nuts in the assembly 37 will determine the tension imposed on the spring 40, which is readjusted when burning a larger or smaller size battery group. The bolt 36 is held in a block 35 which is pivotally affixed to handle structure 45, which handle structure is provided with a cam inner end (Figure 3) bearing against the adjacent surface of the block 25, which block is in turn mounted by plates on either side thereof to the adjacent face of the end plate 4. Thus, as said handle 45 is in the position shown in Figures 1 and 2 of the drawings, it acts through the bolt 36, which extends through a suitable opening in the end plate 11 and is tapped into the plate 28, to draw the movable partition frame leftwardly against the spring 40 and thereby urge the several movable partition members toward their respectively associated stationary members, whereby to grip battery plate groups tightly therebetween. When said handle is moved toward the operator, that is, downwardly as appearing in Figure 3, the cammed end permits the movable frame to move rightwardly in response to the urging of the spring 40.

Reference to Figure 1 will show that the partitions 19 and 22 are so positioned, or shaped, that their respectively adjacent surfaces 41 and 42 are downwardly converging. This convergence is in amount sufficient to effect contacting of the battery plate group primarily at the bottom thereof. In a specific example, wherein said partitions are approximately 5½ inches in width and approximately 6 inches in height, the difference in spacing between the upper end of said partitions and the lower ends thereof will be about ⅛ of an inch, that is, approximately 1/16 of an inch of taper is provided on each partition. This permits holding the battery group firmly but at only the bottom end of the plates thereof to permit sufficient shifting of plates and separators during the closing of the fixture to effect alignment of the lugs with comb teeth 80. The same downwardly convergent relationship exists between the other pairs of partitions provided in a given fixture.

Turning now to the structure at the upper end of the fixture, by which the upper ends of the battery plate groups are held and the basins provided for holding the fusing of material, there is shown a sliding comb holding plate 41. In this specific embodiment herein shown for illustration, the negative side of the battery plate group is on the side facing the operator which is the side from which the apparatus is viewed in Figure 1. Therefore, in this specific embodiment plate 41 is the negative sliding comb holding plate and the corresponding structure, hereinafter mentioned, on the opposite side of the machine relates to the positive side of the battery plate groups. For purposes of reference, and without limitation, they will be so designated hereinafter.

Supported on and by the negative sliding comb holding plate is the negative slotted comb 42. The parts are conveniently held together by cap screws 43. Said negative comb holding plate is held in position by a plate control spacer 44 at either end thereof, each of which supports one of the retaining plates 46 and 47. Actuating blocks 48 and 49 are supported on said negative comb holding plate 41 for reasons appearing hereinafter.

Similar construction appears on the opposite side of the device (Figure 4) and may be indicated generally as a positive sliding comb holding plate 51, a positive slotted comb 52, retaining plates 53 and 54 mounted upon suitable spacers, not shown but similar to the spacers 44, and actuating blocks 56 and 57 similar to the actuating blocks 48 and 49.

At the rightward end of the machine (Figure 2) appears a first actuating lever 61 pivoted to the end plate 6 by the bolt 62. The upper end of said actuating lever 61 is provided with a U-shaped recess for the reception of the negative comb actuating rod 63. Said rod passes through co-axially aligned openings in the actuating blocks 48 and 49 whereby said actuating member 61, by pivotal motion on the bolt 62, will act through the rod 63 to cause inward and outward reciprocation of the comb 42 and the sliding plate 41.

Figure 6:
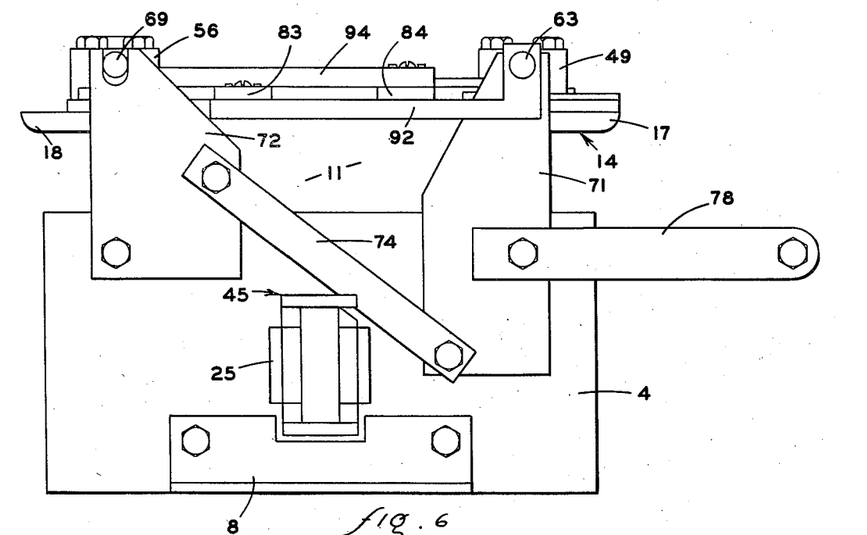
Figure 6 is a view of the end of the device as viewed from the left as shown in Figure 1.

The second actuating lever 66 is similarly pivoted to the end plate 6 by the bolt 67 and said actuating lever has at its upper end a U-shaped recess 68 for the reception of the positive comb actuating rod 69. Said rod 69 is received into co-axial openings in the actuating blocks 56 and 57 whereby pivotal movement of the lever 66 on the bolt 67 will cause inward and outward movement of the positive comb 52 and positive comb holding plate 51. The leftward end of the machine (Figure 6) is provided with actuating levers 71 and 72 which are generally similar to the levers 61 and 66, respectively, and engage the leftward ends of the actuating rods 63 and 69. Links 73 and 74 connect adjacent pairs of actuating levers together for simultaneous movement whereby said actuating rods 63 and 69 are simultaneously moved toward and away from each other but maintained at all times in parallel relationship to each other.

The handle 76 is connected rigidly by the arms 77 and 78 to the actuating levers 61 and 71 by any convenient means, as welding, for pivotal actuation thereof upon the bolt 62 and the counterpart of said bolt 62 associated with the lever 71.

The comb plates 42 and 52 are provided with conventional comb teeth 75 and 80, respectively, which comb teeth are of conventional construction to receive lugs of varying thickness and need no detailing here.

Figure 7:
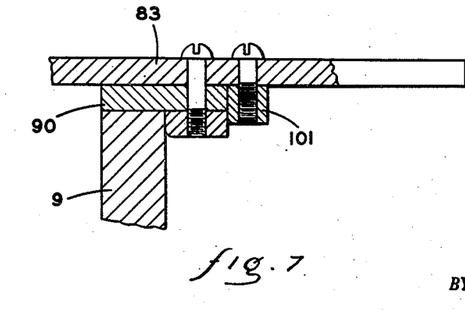
Figure 7 is a section taken on the line VII—VII of Figure 3.

Supported on and above said comb members are comb dam plates 79 and 85 which are provided with cut out sections 81 and 82, respectively, for defining one portion of a basin around said teeth by which the fusible metal is held for the burning process. The post dam supporting strips 83 and 84 are supported upon the upper surfaces of the end plates 9 and 11 (Figure 3) and are slidable therealong on bearings 90 (Figure 7) for motion toward and away from each other. The guide 101 (Figure 7), and its counterpart at the other end of the dam supporting strip 83, hold said strip aligned with said end plates 9 and 11. Said strips are normally disposed parallel to each other and respectively support on their upper sides the post dam members 86 and 87. Said post dam members have conventional cut-outs 88 and 89, respectively, which further define the basins for containing said fusible material.

An arm 91 (Figure 2), together with a similar arm 92 at the other end of said machine, of somewhat bell-crank shape, is pivotally supported upon the actuating rod 63 and is fastened in any convenient manner, as by screws, to the underside of the post dam supporting strip 83. A somewhat similar arm 93, together with its counterpart 94 at the other end of said machine (Figure 6), is pivotally supported upon the actuating rod 69 and is fastened in any convenient manner, as by screws, to the upper side of the post dam supporting strip 84. Thus, as the actuating rods 63 and 69 move toward and away from each other the said last-named links 91, 92, 93 and 94 actuate the post dam supporting strips 83 and 84 toward and away from each other and thereby cause said respective post dams 86 and 87 to move toward and away from contact with the comb dam members 79 and 85.

Operation

Although the operation of this device has been generally indicated above, it will be hereinafter briefly summarized for the purpose of clarity and completeness.

Figure 2:
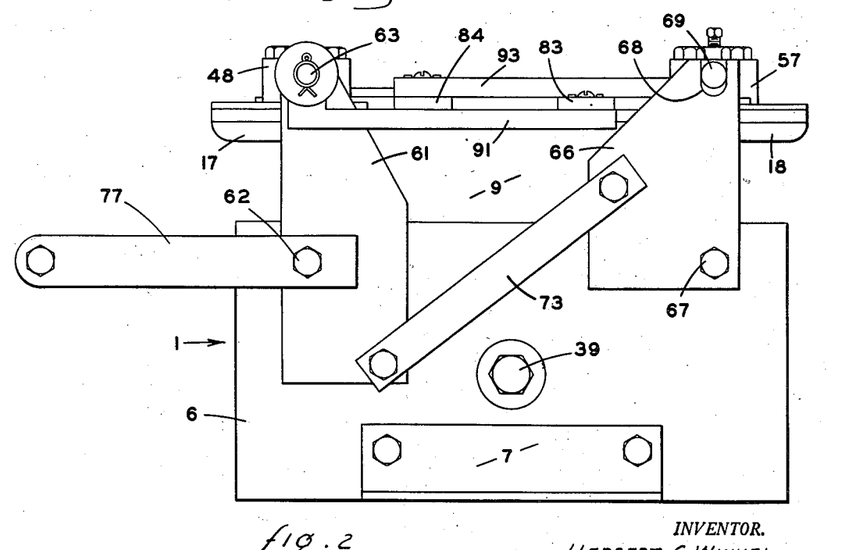
Figure 2 represents an end view of the invention taken at the rightward end as appearing in Figure 1.

With the operator on the side adjacent the handle 76, the post dam supporting strip 84 is first lifted and the structure associated therewith is moved on the rod 69 in a clockwise direction, as appearing in Figure 2, to the full distance which the rest of the structure will permit it so to pivot. This distance will at the least be more than 90 degrees from the position shown in Figure 2. Next, the post dam supporting strip 83 is lifted and the structure associated therewith is caused to pivot in a counterclockwise direction, as appearing in Figure 2, the maximum distance permitted by the structure which will be at least 90 degrees from position shown in Figure 2 and will preferably be sufficient that it will reach a point adjacent the handle 76 in order to be fully out of the operator's way as the battery plate groups are loaded into the fixture. The handle 45 is then moved toward the operator to permit the spring 40 to move the movable partitions supporting frame rightwardly to open the respective partitions for the reception of a battery plate group. Lastly, the handle 76 is pushed downwardly its maximum distance whereby to pivot the lever 61 in a counterclockwise direction (Figure 2) and the lever 66 in a clockwise direction. This causes movement of the actuating bars 63 and 69 in respectively opposite directions by which the comb members 42 and 52, and the comb dam structures associated therewith, are also moved away from each other a distance sufficient to uncover completely the spaces between the several partitions. This is the open position. Battery plate groups are then arranged as desired and placed in condition ready for burning between said partitions and with the separators resting on the supporting strips 32 and 33 (Figure 4), each battery plate group being between a pair of downwardly convergent walls, as the mutually facing walls of the partitions 19 and 22, mutually facing walls of the partitions 20 and 23, and the mutually facing walls of the partitions 21 and 24.

The handle 45 is then moved into the position shown in the drawings and the movable partition frame is thus pulled leftwardly thereby sufficiently to urge the movable partitions toward the stationary partitions and thus grip the respective battery plate groups tightly between each cooperative pair of partitions. However, due to the tapering of the opposed partition surfaces, the gripping of the battery plate groups is largely at the lower edges thereof so that slight motions of the upper ends of said plates may be effected as needed to permit the comb teeth members 75 and 80 (Figure 3) to enter between the several lugs in the battery plate groups. The post dam supporting strip 83, and the structure associated therewith, is then pivoted clockwise around the actuating rod 63 into the position shown in Figure 2 in order that the said strip may rest, by its bearing plate 90 and its counterpart on the other end of the fixture, on the upper edges of the end plates 9 and 11. Next the post dam strip 84 and the structure associated therewith is rotated counterclockwise as the same appear in Figure 2 into the position shown in Figure 2 where the surface of said post dam supporting strip 84 rests on the upper surfaces of the end plates 9 and 11. Lastly, the handle 76 is lifted into the position shown in the drawings which moves the comb members and the comb dam strips towards each other until they contact the respectively facing surfaces of the post dam strips. Thus, the comb teeth enter between the several lugs of the battery plate groups for properly spacing said lugs and for providing a closure between said lugs to define the bottoms of the several fusible material receiving basins. The walls defining the cut-out portions 81 and 82, and the walls of the respective post dams facing said cut-out portions, together with the walls of the cut-outs 88 and 89, define basins for receiving the battery post to be fused to said lugs and for receiving the metal whereby such fusing, or burning, is accomplished.

At this point the device is ready for the burning operation which may be accomplished in the usual manner by placing a quantity of fusible material in each of said basins, supplying heat, as with a blow torch, against the several basins and the fusible material therein, either simultaneously or successively, and thereby in a conventional manner fusing the several posts to the battery plate lugs.

When the fusing operation is completed, the battery plate groups are released by again moving the handle 45 toward the operator and reversing all of the above mentioned closing steps whereby the apparatus is again placed in its open position and the battery plate groups may be removed.

It will be observed that where battery plate groups of different sizes, or different thicknesses or numbers of plates, are to be handled in a given fixture, the several comb and dam members may be readily removed from the machine and other members shaped to accommodate said other battery plate groups substituted therefor. It may also be appreciated that by changing the post dam members appropriately the apparatus can readily be adapted for connectors having the post either in the center thereof or offset from the center as desired.

Figure 8:
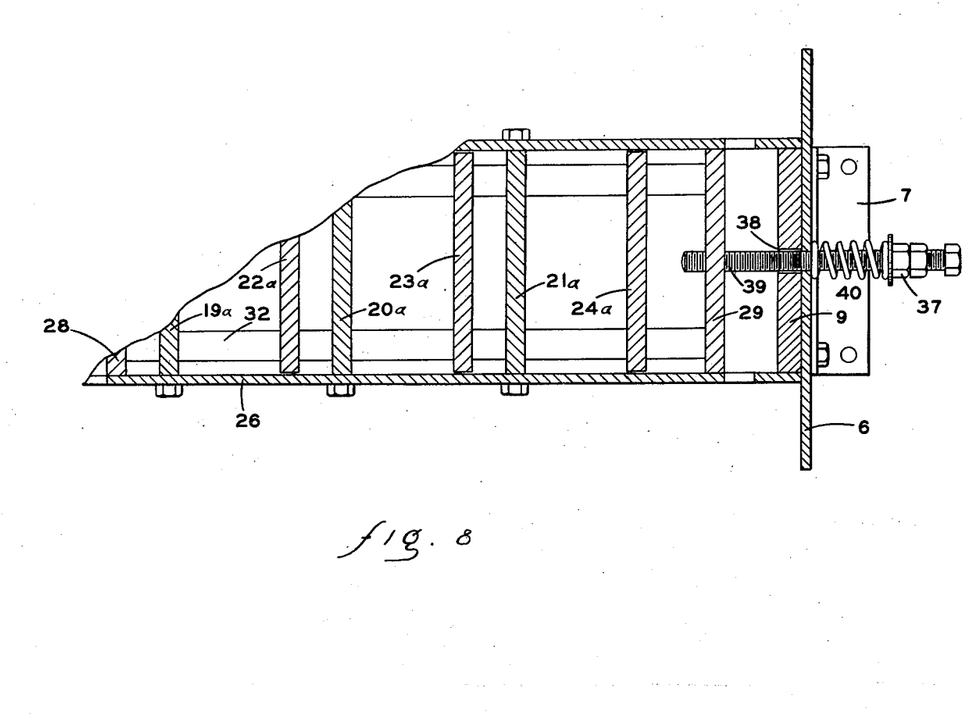
Figure 8 is a section similar to that taken on the line V—V of Figure 1 to show an alternate structure.

Figure 8 illustrates a modification wherein the action of the spring 40 is utilized to urge the partitions defining a given chamber together and the handle 45 draws said partitions apart. This is accomplished by making the partitions 19a, 20a and 21a the movable partitions and affixing them to the members 26 and 27 and making the partitions 22a, 23a and 24a the fixed partitions and mounting them on the members 12 and 13.

Accordingly, it will be appreciated that I have herewith disclosed a battery plate group burning fixture of construction adapted for, and capable of, carrying out the objects and purposes above set forth.

While a specific example of my invention has been herewith utilized for illustrative purposes, it will be understood that numerous variations may be made without departing from the scope of the hereinafter appended claims, excepting as said claims by their own terms expressly require otherwise.

I claim:

1. In a group burning fixture for a plurality of battery plate groups, the combination comprising: a frame defining a battery plate receiving zone; partitions within said frame and extending across said zone and substantially from the top to a point near the bottom thereof defining a plurality of battery plate receiving chambers; a comb structure including teeth, and means supporting said comb structure for reciprocable movement in a direction parallel to the horizontal direction of said partitions, and said comb structure including walls partially defining around said teeth a basin for retaining molten fusing material for the upstanding lugs of said battery plates; a dam member and means supporting same for reciprocation in a direction parallel to the direction of reciprocation of said comb structure and positioned with respect to said comb structure for completing the wall defining said basin around the teeth of said comb when said comb structure and said dam member are in mutually engaged relationship to each other; an operating handle pivoted to said frame at one end thereof and linkage connecting said handle to both of said dam member and said comb structure for simultaneously moving same toward and away from each other from a position respectively above opposite sides of said battery plate receiving chambers to a position in engagement with each other; means pivotally mounting said dam member onto said linkage for lifting said member above and clear of said zone.

2. In a group burning fixture for a plurality of battery plate groups, the combination comprising: a frame defining a battery plate receiving zone; a plurality of partitions within said frame and extending across said zone and substantially from the top to a point near the bottom thereof defining a plurality of battery plate receiving chambers; a comb supporting plate and means supporting said plate for slidable movement toward and away from a position above said battery plate receiving chambers; comb structure including teeth, said comb structure being positioned on said comb supporting plate for movement therewith, and said comb structure including walls partially defining around said teeth a basin for retaining molten fusing material for the upstanding lugs of said battery plates; a dam member and means supporting same for reciprocation in a direction parallel to the direction of reciprocation of said comb structure and positioned with respect to said comb structure for completing the wall defining said basin around the teeth of said comb when said comb structure and said dam member are in mutually engaged relationship to each other; an operating handle pivoted to said frame at one end thereof and linkage connecting said handle to both of said dam member and said comb structure for simultaneously moving same toward and away from each other from a position respectively above opposite sides of said battery plate receiving chambers to a position in engagement with each other; means pivotally mounting said dam member onto said linkage for lifting said member above and clear of said zone.

3. Means defined in claim 1 including also: a dam member supporting arm, one end of said arm supporting said dam member and the other end of said arm being pivoted to an element of said last named linkage for pivotal movement in and out of comb engaging position.

4. In a group burning fixture for a plurality of battery plate groups, the combination comprising: a frame defining a battery plate receiving zone; a plurality of partitions within said frame and extending across said zone and substantially from the top to a point near the bottom thereof defining a plurality of battery plate receiving chambers; a pair of comb supporting plates spaced from each other and positioned parallel with respect to each other and means on said frame for supporting said plates for reciprocable movement toward and away from each other; a rod supported on each of said plates and spaced above each of said plates and arranged longitudinally parallel with each of said plates; a comb structure having a plurality of comb sections supported on each of said plates; a pair of dam structures each having a plurality of dam sections positioned parallel with each of said plates and means supporting said dam structures on said frame for reciprocable movement toward and away from said comb structures; a first pair of arms connected to the respective ends of a first of said dam structures and extending toward one of said rods past the other of said dam structures; a second pair of arms extending toward the other of said rods past the first named of said dam structures, said arms being pivoted on said rods; manually operable means for moving said plate members toward and away from each other and thereby also moving respective pairs of dam structures and comb members toward and away from each other; said parts being so arranged that each of said comb sections is opposite one of said dam sections and each such corresponding pair of comb and dam sections is respectively positioned between the ends of and above one of said chambers.

5. Structure as defined in claim 4 wherein said last named means includes: a centrally pivoted lever at one end of said frame and disposed substantially vertically thereof and pivotally affixed to a first of said comb supporting plates by its upper end; a second pivotal lever affixed to said frame near its lower end and affixed to the other of said comb supporting plates near its upper end; a linkage extending from the lower end of said first pivoted link to a point between the upper and lower ends of said second pivoted link; manually operable means for effecting pivotal movement of said first lever.

6. Apparatus as defined in claim 1 wherein adjacent walls of said partitions are resilient and converge toward each other in a downward direction whereby said chambers are smaller at their lower ends than at their upper ends.

7. Apparatus as defined in claim 4 wherein said partitions defining a single battery plate receiving chamber are so related to each other that they bear resiliently against opposite ends of a battery plate group.

8. Apparatus as defined in claim 4 wherein each pair of said partitions which co-operate with each other to define a single battery plate receiving chamber bear against the surfaces of opposite end plates of a battery plate group, at least one of said pair of partitions bearing resiliently against said battery plate group.

9. Apparatus as defined in claim 4 wherein each pair of said partitions which co-operate with each other to define a single battery plate receiving chamber bear against the surfaces of opposite end plates of a battery plate group in the lower portion of said opposite end plates, at least one of said pair of partitions bearing resiliently against said battery plate group.

10. In a group burning fixture for a plurality of battery plate groups, the combination comprising: a frame defining a battery plate receiving zone; partitions within said frame and extending across said zone and substantially from the top to a point near the bottom thereof defining a plurality of battery plate receiving chambers; a comb structure including teeth, and means supporting said comb structure for reciprocable movement in a direction parallel to the horizontal direction of said partitions, and said comb structure including walls partially defining around said teeth a basin for retaining molten fusing material for the upstanding lugs of said battery plates; a dam member and means supporting same for reciprocation in a direction parallel to the direction of reciprocation of said comb structure and positioned with respect to said comb structure for completing the wall defining said basin around the teeth of said comb when said comb structure and said dam member are in mutually engaged relationship to each other, additional support means for said dam member permitting said dam member to be lifted above and clear of said zone; an operating handle operatively affixed to said frame and positively operable mechanism connecting said handle to both of said dam member and said comb structure for moving same toward and away from each other from the position uncovering opposite sides of said battery plate chambers to a position in engagement with each other.

11. In a group burning fixture for a plurality of battery plate groups, the combination comprising: a frame defining a battery plate receiving zone; partitions within said frame and extending across said zone and substantially from the top to a point near the bottom thereof for defining a plurality of battery plate receiving chambers; a comb structure including teeth and means supporting said comb structure for reciprocable movement in a direction parallel to the horizontal direction of said partitions, and said comb structure including walls partially defining around said teeth a basin for retaining molten fusing material for the upstanding lugs of said battery plates; a dam member positioned parallel with said comb structure and including means for completing the wall defining said basin around the teeth of said comb when said comb structure and said dam member are in mutually engaged relationship to each other; means extending across said frame for supporting said dam member in said mutually engaged relationship to said comb member, additional support means for said dam member permitting said dam member to be lifted above and clear of said zone; an operating handle operatively affixed to said frame and positively operating means connecting said handle to said comb structure for moving same toward and away from a position in engagement with the upstanding lugs of said battery plate group.

12. Apparatus defined in claim 1 including: a pair of parallel bars extending beneath but close to the lower edges of said partitions to provide support for said battery plate groups and threaded means supported by said frame and threadedly engaging said bars to provide for vertical adjustment of the position of said bars.

13. In a group burning fixture for a plurality of battery plate groups, the combination comprising: a frame defining a battery plate receiving zone; partitions within said zone and extending transverse thereof and defining a plurality of battery plate receiving chambers; a comb structure including teeth, and means supporting said comb structure for reciprocable movement in a direction parallel to the horizontal direction of said partitions, said comb structure including walls partially defining around said teeth a basin for retaining molten fusing material for the upstanding lugs of said battery plates; a dam member and means supporting same for reciprocation in a direction parallel to the direction of reciprocation of said comb structure and positioned with respect to said comb structure for completing the wall defining said basin around the teeth of said comb when said comb structure and said dam member are in mutually engaged relationship to each other; an operating handle pivoted to said frame at one end thereof and linkage connecting said handle to both of said dam member and said comb structure for simultaneously moving same toward and away from each other from a position respectively above opposite sides of said battery plate receiving chambers to a position in engagement with each other; means pivotally mounting said dam member onto said linkage for lifting said dam member above and clear of said zone.

14. Apparatus as defined in claim 13 wherein said partitions which cooperate with each other to define a single battery plate receiving chamber have surfaces which bear against the surfaces of opposite end plates of a battery plate group, the surface on at least one of said partitions bearing resiliently against the surface of the end plate in contact therewith.

15. In a group burning fixture for a plurality of battery plate groups, the combination comprising: a frame defining a battery plate receiving zone and including side plates and a pair of end plates; a plurality of fixed partitions uniformly spaced from each other in parallelism with each other and with said end plates and extending between said side plates; a bottom support member positioned intermediate said side plates and extending the full length of said battery plate receiving zone; a plurality of uniformly spaced movable partitions, each thereof being alternatively positioned with respect to the said fixed partitions, each thereof being paired with one of said fixed partitions; a comb structure including teeth, means supporting said comb structure on said frame above said side plates and between said end plates for reciprocable movement in a direction parallel to the horizontal direction of said partitions; a dam member and means supporting same on said frame and positioned with respect to said comb structure for completing the wall defining a basin around the teeth of the comb for retaining molten fusing material for the upstanding lugs of said battery plates when said comb structure and said dam member are in mutually engaged relationship to each other; linkage connected to said comb structure and said dam member for moving said comb structure and said dam member toward and away from each other; means pivotally connecting said dam member to said linkage whereby said dam member may be pivoted above and clear of said zone; means extending into said zone connected to each of said movable partitions for connecting said movable partitions with each other for simultaneous and equal movement with respect to said side plate; means resiliently and constantly urging said movable partitions as a unit in such a direction that each movable partition will move toward its respectively fixed partition and means positively limiting the extent of such movement.

16. In a group burning fixture for a plurality of battery plate groups, the combination comprising: a frame defining a battery plate receiving zone and including side plates and a pair of end plates; a plurality of fixed partitions spaced from each other and extending between said side plates; a bottom support member positioned intermediate said side plates and extending the full length of said battery plate receiving zone; a plurality of spaced movable partitions, each thereof being paired with one of said fixed partitions; a comb structure including teeth, means supporting said comb structure on said frame above said side plates and between said end plates for reciprocable movement in a direction parallel to the horizontal direction of the partitions; a dam member and means supporting same on said frame and positioned with respect to said comb structure for completing the wall defining a basin around the teeth of the comb for retaining molten fusing material for the upstanding lugs of said battery plates when said comb structure and said dam member are in mutually engaged relationship to each other; linkage connected to said comb structure and said dam member for moving said comb structure and said dam member toward and away from each other; means pivotally connecting said dam member to said linkage whereby said dam member may be pivoted above and clear of said zone; means external to said zone connected to each of said movable partitions for connecting said movable partitions with each other for simultaneous and equal movement with respect to said side plates; means constantly urging the movable partitions in a direction toward the fixed partitions and manually operated means for moving said movable partitions as a unitary group a predetermined distance away from said fixed partitions.

17. The device defined in claim 16 wherein said last named means includes a cam and manually operable means for actuating said cam.

18. In a group burning fixture for a plurality of battery plate groups, the combination comprising: a frame defining a battery plate receiving zone and including side plates and a pair of end plates; a plurality of fixed partitions spaced from each other lying between, and extending transverse to, said side plates; a bottom support member positioned intermediate said side plates and extending the full length of said battery plate receiving zone; a plurality of spaced movable partitions, each thereof being paired with one of said fixed partitions; a comb structure including teeth, means supporting said comb structure on said frame above said side plates and between said end plates for reciprocal movement in a direction parallel to the horizontal direction of the partitions; a dam member and means supporting same on said frame and positioned with respect to said comb structure for completing the wall defining a basin around the teeth of the comb for retaining molten fusing material for the upstanding lugs of said battery plates when said comb structure and said dam member are in mutually engaged relationship to each other; linkage connected to said comb structure and said dam member for moving said comb structure and said dam member toward and away from each other; means pivotally connecting said dam member to said linkage whereby said dam member may be pivoted above and clear of said zone; means external to said zone connected to each of said movable partitions for connecting said movable partitions with each other for simultaneous and equal movement with respect to said side members.

References Cited in the file of this patent

UNITED STATES PATENTS

| | | |
|---|---|---|
| 871,393 | Flanders | Nov. 19, 1907 |
| 1,932,136 | Hole | Oct. 24, 1933 |
| 1,960,195 | Nyce | May 22, 1934 |
| 2,430,188 | Sargent | Nov. 4, 1947 |
| 2,505,514 | Anderson | Apr. 25, 1950 |
| 2,745,367 | Tiegel | May 15, 1956 |